Patented Feb. 4, 1936

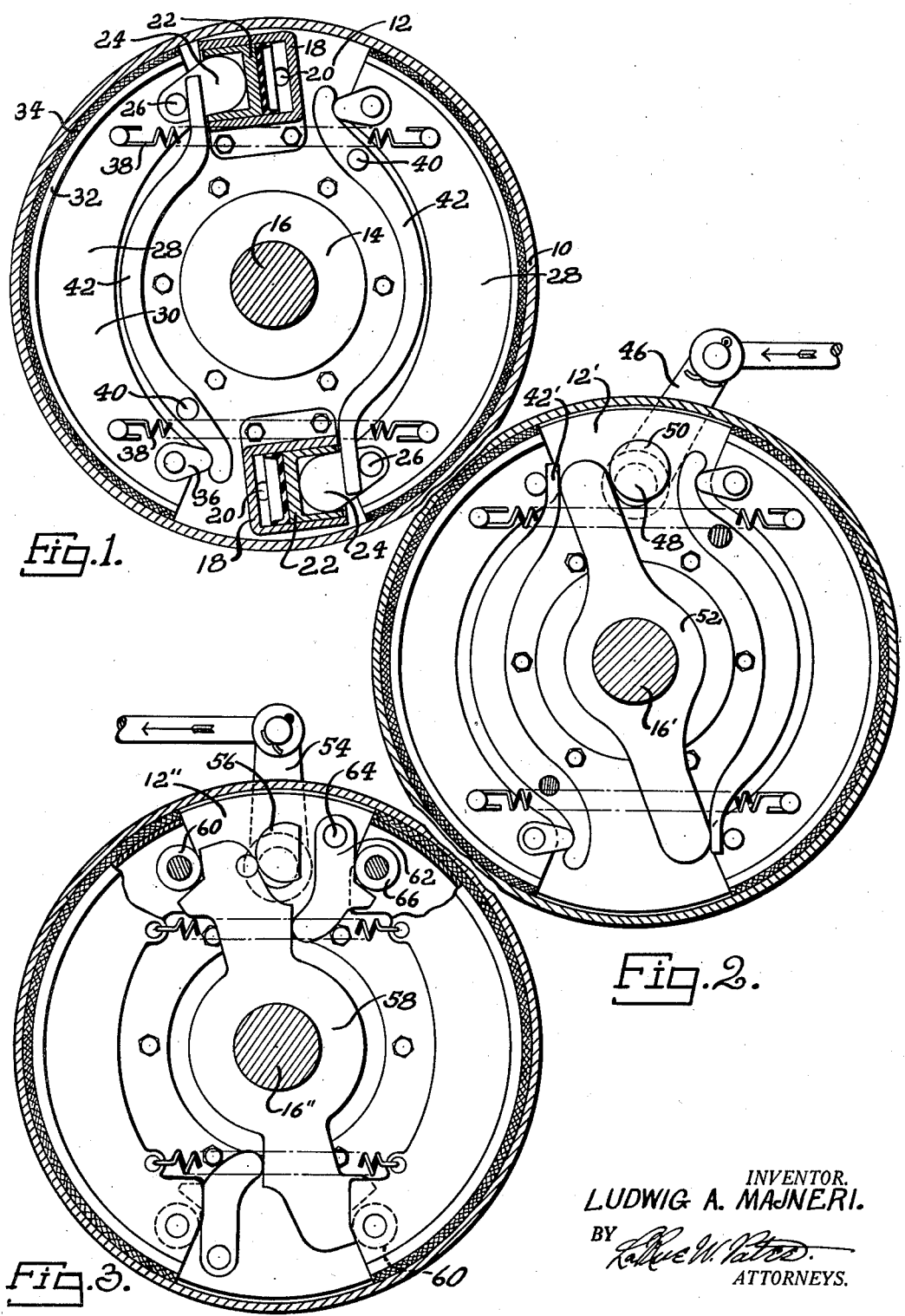

2,029,884

UNITED STATES PATENT OFFICE 2,029,884

BRAKE MECHANISM

Ludwig A. Majneri, Detroit, Mich.

Application October 6, 1933, Serial No. 692,507

2 Claims. (Cl. 188—78)

This invention relates to a brake mechanism and is illustrated as embodied in a brake mechanism for wheels, such as used on automobiles or airplanes.

One object of the invention is to provide a brake mechanism of the internal shoe type which is to some extent self-energizing.

Another object of the invention is to provide an inexpensive structure which may be used for either mechanical or hydraulic brakes and in which the parts have been reduced to a minimum.

Other objects and advantages of the invention will more fully appear from the following description taken in connection with the accompanying drawing, in which:

Fig. 1 is a side view, partly in section, showing a preferred embodiment of my invention wherein the hydraulic solution is used for applying the brakes.

Fig. 2 is a view corresponding to Fig. 1 showing a modified form of my invention in which mechanical means is provided for applying the brakes.

Fig. 3 is a view corresponding to Fig. 1 showing a further modification of my invention.

Referring to the drawing, reference numeral 10 designates a wheel drum having a back flange (not shown) to which the wheel is secured. A plate 12 is secured to a flange 14 on a stationary axle 16. This flange serves as a supporting plate and also has a closure for the open face of the drum.

Referring specifically to Fig. 1, I have shown a pair of oppositely disposed cylinders 18 which are adapted to receive a fluid pressure through an opening 20. A piston 22 is provided in the cylinder which receives an arm 24 pivoted as at 26 on a brake shoe 28. I have shown two oppositely disposed brake shoes 28 having a radially extending reinforcing flange 30 and a transverse base 32 to which is secured a friction material 34. The arm 24 is secured at one end of the shoe and at the opposite end of the shoe I have provided another arm 36 which is also pivotally supported on the radial flange 30. Tension springs 38 are secured to the adjacent ends of the oppositely disposed shoes to retain the shoes in normal operating position.

Pivotally mounted, as at 40, are lever arms 42 which have their opposite ends in engagement with the opposite ends of the shoes respectively. The pivot 40 is adjacent the end of the shoe remote from the pressure applying means. In the operation of the device the fluid pressure is applied between the piston 22 and the head of the cylinder 18, causing the brakes to expand radially outwardly into frictional engagement with the drum 10. There is also a slight pressure causing the brakes to move circumferentially and this pressure, together with the rotation of the drum, causes the shoe to move slightly circumferentially. This movement causes the lever 42 to pivot about its center 40, applying pressure on the end of the shoe adjacent the brake applying means. Thus, it will be understood that any circumferential movement of the shoes causes a radial pressure on the shoes to increase the frictional resistance of the brake lining material on the rotating drum.

The position of the pivot 40 is of considerable importance, it being preferable to have the short arm approximately one-sixth the length of the longer arm. This is important because too much pressure on the short arm would cause the brakes to be locked; that is, the self-energizing movement would be sufficient to overcome the tension of the springs 38 and the return mechanism for the brake applying means. The brake shoes are supported in position by the levers 24 and 36, the lever 24 being supported in the piston 22 and the lever 36 being positioned on the end of the short arm of the lever 42. The springs 38 further serve as a means for positioning the shoes relative to the drums.

Referring to Fig. 2, I have shown a modified form of my invention in which a lever 46 is pivotally mounted as at 48 on the plate 12'. An eccentric member 50 is provided adjacent the pivot 48 and secured to the arm 46 so that movement of the arm 46 in a direction indicated by the arrow causes circumferential movement of a lever 52. This lever 52 is journaled on the axle 16' and is provided with oppositely extending arms which engage the end of the long arms 42'. The operation of this form of my invention is substantially the same as that shown in Fig. 1.

Referring to Fig. 3, I have shown a lever 54 which constitutes the brake operating mechanism. This lever is also provided with a cam 56 which causes circumferential movement of a lever 58 journaled on the shaft 16''. In this form of the invention the energizing means is taken through the lever 58, there being provided rollers 60 for engagement with the opposite ends of the lever 58. As a means for transferring movement of one end of the brake shoe to the lever 58 I have provided an arm 62 pivoted as at 64 to the back plate 12''. The shoe, through a roller 66, engages the arm 62, causing it to force the lever 58 circumferentially, thereby applying radial movement to the opposite end of the same shoe.

While I have described what I deem to be the preferred embodiments of my invention, I do not wish to be limited to any of the specific forms shown as it will be understood that various changes, including the size, shape, and arrangement of parts, may be made without departing from the spirit of my invention, and it is not my intention to limit its scope other than by the terms of the appended claims.

What I claim is:

1. In a brake mechanism the combination of a rotatable drum, a supporting plate adjacent said drum, brake shoes for frictional engagement with the inner periphery of said drum, operating means for each shoe disposed diametrically opposite each other, each engaging one end of each shoe, a lever pivotally supported on said plate having its opposite ends respectively in engagement with the opposite ends of one of said shoes, said pivot being intermediate the ends of said lever and adjacent the end of said shoe opposite the applying means, and resilient means normally holding the shoes away from engagement with the inner periphery of said drum.

2. In a brake mechanism the combination of a rotatable drum, a supporting plate, oppositely disposed brake shoes within said drum, means between the adjacent ends of said shoes for moving said shoes into frictional engagement with the inner periphery of said drum, each acting on one end of each shoe, levers pivotally mounted on said supporting plate, each having its opposite ends in engagement with the opposite ends of each shoe, the pivots for said levers being diametrically opposed and adjacent the end of the shoe remote from the shoe operating means, and means for resiliently holding said shoe in normal position.

LUDWIG A. MAJNERI.